J. W. SMITH.
AUTOMATIC GAS CUT-OFF.
APPLICATION FILED JULY 5, 1916.
1,211,975.
Patented Jan. 9, 1917.
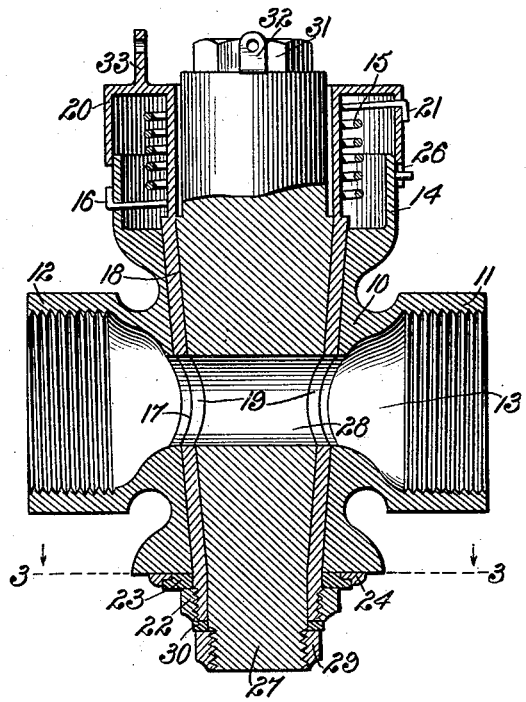
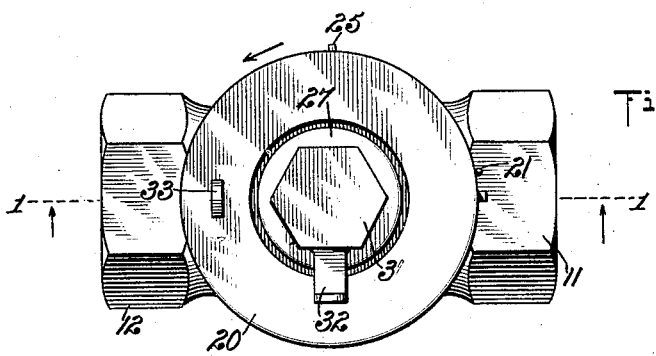
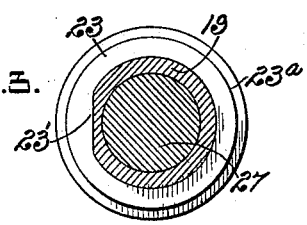
WITNESSES
INVENTOR
J. W. Smith
BY
ATTORNEYS

UNITED STATES PATENT OFFICE.

JOHN W. SMITH, OF BROOKLYN, NEW YORK.

AUTOMATIC GAS CUT-OFF.

1,211,975.   Specification of Letters Patent.   Patented Jan. 9, 1917.

Application filed July 5, 1916.   Serial No. 107,559.

*To all whom it may concern:*

Be it known that I, JOHN W. SMITH, a citizen of the United States, and a resident of the city of New York, borough of Brooklyn, in the county of Kings and State of New York, have invented a new and Improved Automatic Gas Cut-Off, of which the following is a full, clear, and exact description.

This invention relates to automatic valves and has particular reference to valves used in connection with gas pipes or the like.

Among the objects of the invention is to provide a novel type of compound valve including a plurality of independently movable parts with facilities coöperating therewith to cause the shutting off of the flow of gas or other fluid automatically in the event of local fire.

More definitely stated, one of the principal objects of this invention is to provide a gas valve including a rotary plug for controlling the flow of gas in the usual manner and also a valve sleeve surrounding the plug and normally held open by fusible metal, but which is adapted to automatically spring closed to shut off the flow of gas when the fusible metal melts.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a vertical sectional view on the line 1—1 of Fig. 2; Fig. 2 is a plan view of the same; and Fig. 3 is a transverse sectional detail on the line 3—3 of Fig. 1.

Referring now more particularly to the drawings I show a valve body 10 of any suitable construction and provided with coupling flanges 11 and 12, between which a passageway 13 leads. The valve body is or may be substantially similar to ordinary devices already in use.

At the upper portion of the body is provided an integral crown 14 constituting one half of a casing in which is housed a spiral spring 15 having one end secured at 16 in said crown. The body is provided with a valve seat 17, the axis of which is perpendicular to the axis of the opening 13.

At 18, I show a valve sleeve fitted in the seat 17 and provided on opposite sides with holes 19 which register with the transverse passageway 13. The upper end of the sleeve is rigidly connected in any suitable manner with a crown 20 which includes a downwardly projecting flange embracing the upper edge of the crown 14 and constituting the other half of the casing above referred to. The opposite end of the spring 15 is secured at 21 in the crown 20. At the lower end the sleeve 18 is fitted with a nut 22 bearing upwardly against a washer 23 which is held from rotation on the sleeve by means of a flat face 23'. The sleeve 18 in setting the device for operation is turned around its axis sufficiently to store up energy in the spring 15, and then a line of solder or fusible metal 24 is run around the washer 23 or in the joint between the washer and the lower end of the body 10. The washer 23 is rabetted as shown at 23ª for this purpose. A stop pin 25 is then secured in the crown 14 and a projection 26 is suitably secured to the crown 20 to limit the movement of the sleeve through an angle of about ninety degrees when the fusible metal melts permitting the stored force of the spring to turn the sleeve to its closed position.

Fitted within the sleeve 18 and adapted to operate in the usual manner, is a valve plug 27 having a transverse hole 28 to make or prevent communication through the registering openings 13 and 19 according to the position of the plug. The plug 27 is held from upward displacement by means of a nut 29 and washer 30 bearing against the lower end of the sleeve 18. The upper end of the plug is reduced for the application of a wrench or other tool at the point 31 for opening and closing the valve under ordinary conditions.

The operation of the invention may be briefly summarized as follows: The body is connected to adjacent pipe sections in the usual manner and the sleeve is set as indicated in Fig. 1, so that the holes 19 will be in registry with the opening or passageway 13 through the head. The sleeve, as stated above, is then locked in position by the fusible metal, but under the tension of the spring 15 tending to close or turn the sleeve through ninety degrees. The valve plug 27 is adapted to be turned to open or close the valve as desired independently of the movement of the sleeve 18. When the valve plug is turned to close the valve, it may be locked by means of a padlock (not shown) or other device passing through the registering holes of a pair of ears 32 and 33 carried by the upper end of the plug and the crown 20 respectively. In the event of fire in the locality of the valve, the heat will melt the metal 24, whereupon the spring will immediately snap the sleeve 18 around to inclose the passageway 13. The valve plug at this time may be turned with the sleeve, but whether it is or not will be immaterial because the flow will be cut off by the imperforate portion of the sleeve.

I claim:

In an automatic valve, the combination of a rigid body having a transverse passageway therethrough, a sleeve fitted in the body and having diametrically oppositie holes normally registering with said passageway, means acting between the sleeve and the body tending to turn the sleeve automatically, fusible metal normally locking the sleeve from rotation, and a valve plug fitted in the sleeve and having a transverse hole adapted to register with the passageway and holes aforesaid.

JOHN W. SMITH.

Copies of this patent may be obtained for five cents each, by addressing the "Commissioner of Patents, Washington, D. C."